(12) United States Patent
Hilsabeck et al.

(10) Patent No.: US 8,251,630 B2
(45) Date of Patent: Aug. 28, 2012

(54) BAG HANDLING ASSEMBLY FOR A GRAIN BAG UNLOADING APPARATUS

(75) Inventors: Douglas A. Hilsabeck, Lacombe (CA); Peter Verhoog, Ponoka (CA)

(73) Assignee: Renn Mill Center Inc., Lacombe, Alberta (CA)

( * ) Notice: Subject to any disclaimer, the term of this patent is extended or adjusted under 35 U.S.C. 154(b) by 504 days.

(21) Appl. No.: 12/482,874

(22) Filed: Jun. 11, 2009

(65) Prior Publication Data

US 2009/0311080 A1  Dec. 17, 2009

Related U.S. Application Data

(60) Provisional application No. 61/097,618, filed on Sep. 17, 2008, provisional application No. 61/060,883, filed on Jun. 12, 2008.

(51) Int. Cl.
*B65G 65/22* (2006.01)
(52) U.S. Cl. .................. 414/412; 198/506; 241/101.742
(58) Field of Classification Search .................. 414/411, 414/412; 198/506; 241/101.742
See application file for complete search history.

(56) References Cited

U.S. PATENT DOCUMENTS

| | | | | |
|---|---|---|---|---|
| 3,876,260 | A * | 4/1975 | Moss et al. | 406/29 |
| 4,420,119 | A * | 12/1983 | Johnson | 241/101.71 |
| 5,228,628 | A * | 7/1993 | Temburg et al. | 241/101.4 |
| 5,375,961 | A * | 12/1994 | Mojden et al. | 414/412 |
| 6,109,552 | A * | 8/2000 | Strankman | 241/101.72 |
| 7,802,956 | B2 * | 9/2010 | Schertz et al. | 414/403 |
| 7,861,851 | B2 * | 1/2011 | Dekoning | 198/513 |
| 7,997,849 | B2 * | 8/2011 | Twiestmeyer et al. | 414/412 |

FOREIGN PATENT DOCUMENTS

CA 2610523 A1 5/2009

OTHER PUBLICATIONS

Canadian Office Action dated Apr. 8, 2011 received concerning the corresponding Canadian application- 3 pgs.

* cited by examiner

*Primary Examiner* — James Keenan
(74) *Attorney, Agent, or Firm* — Davis & Bujold, P.L.L.C.

(57) ABSTRACT

A grain bag handling assembly for a grain bag unloading apparatus having an auger assembly with an input end which is inserted into a mouth of an elongated grain bag and a remote output end. The grain bag handling assembly includes a rotatably mounted spool onto which the grain bag is rolled. The spool has a changeable diameter. A drive motor is provided for rotating the spool.

19 Claims, 20 Drawing Sheets

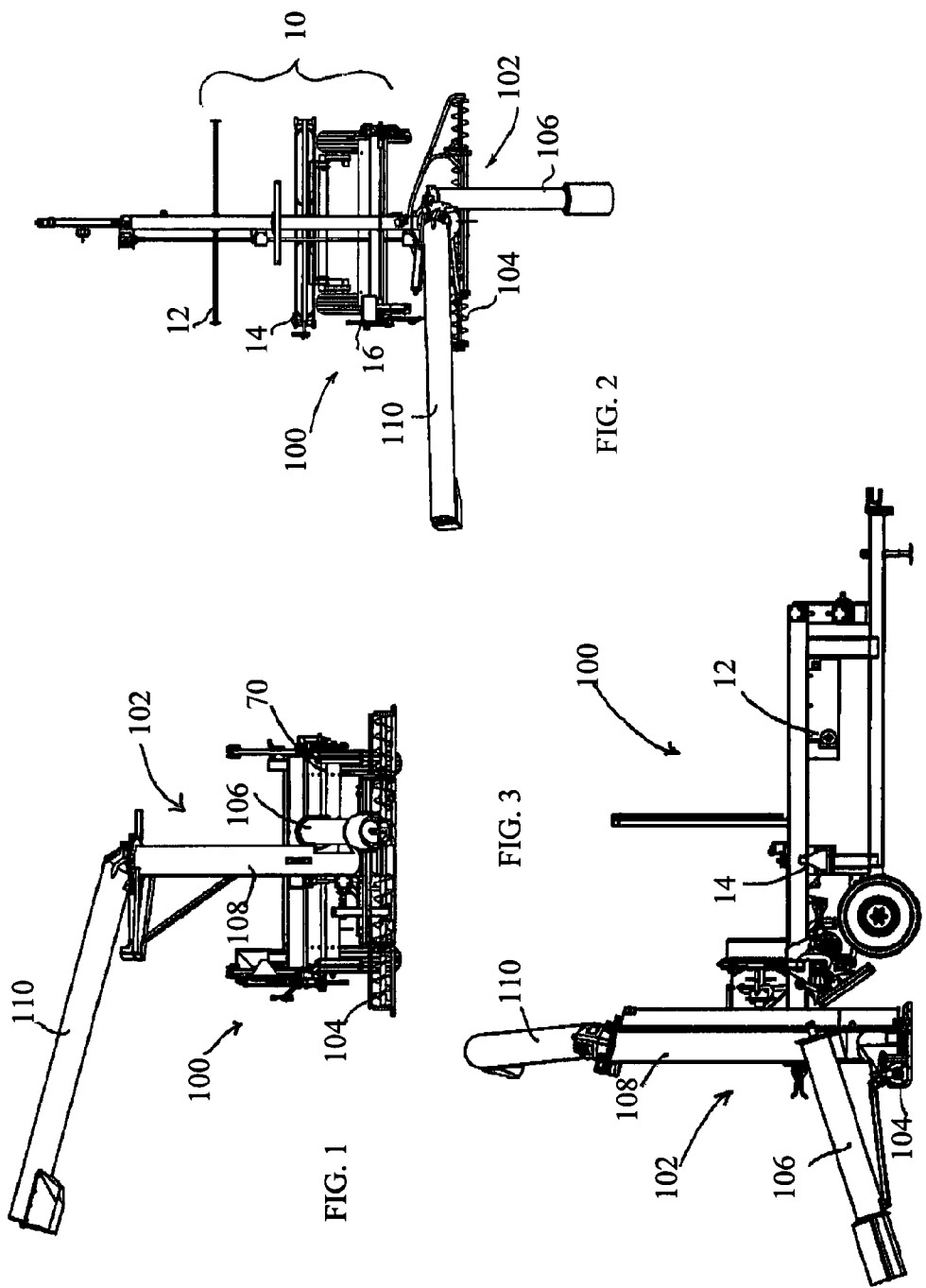

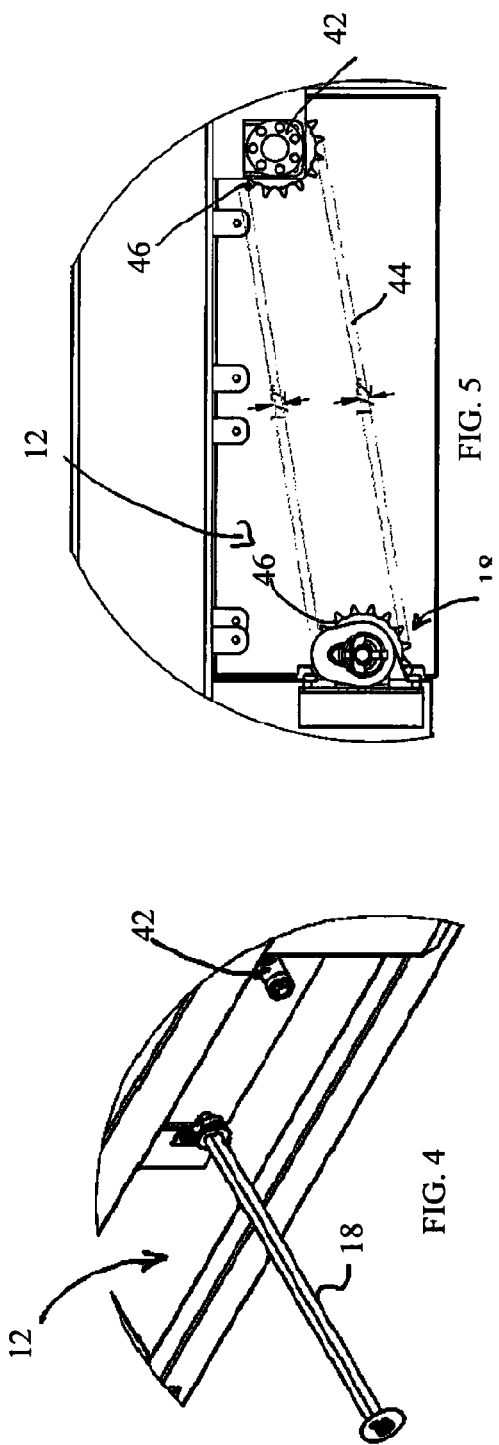
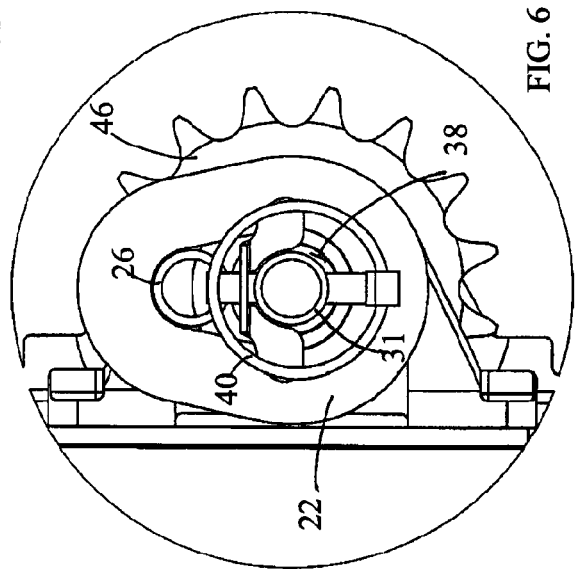
FIG. 5
FIG. 6
FIG. 4

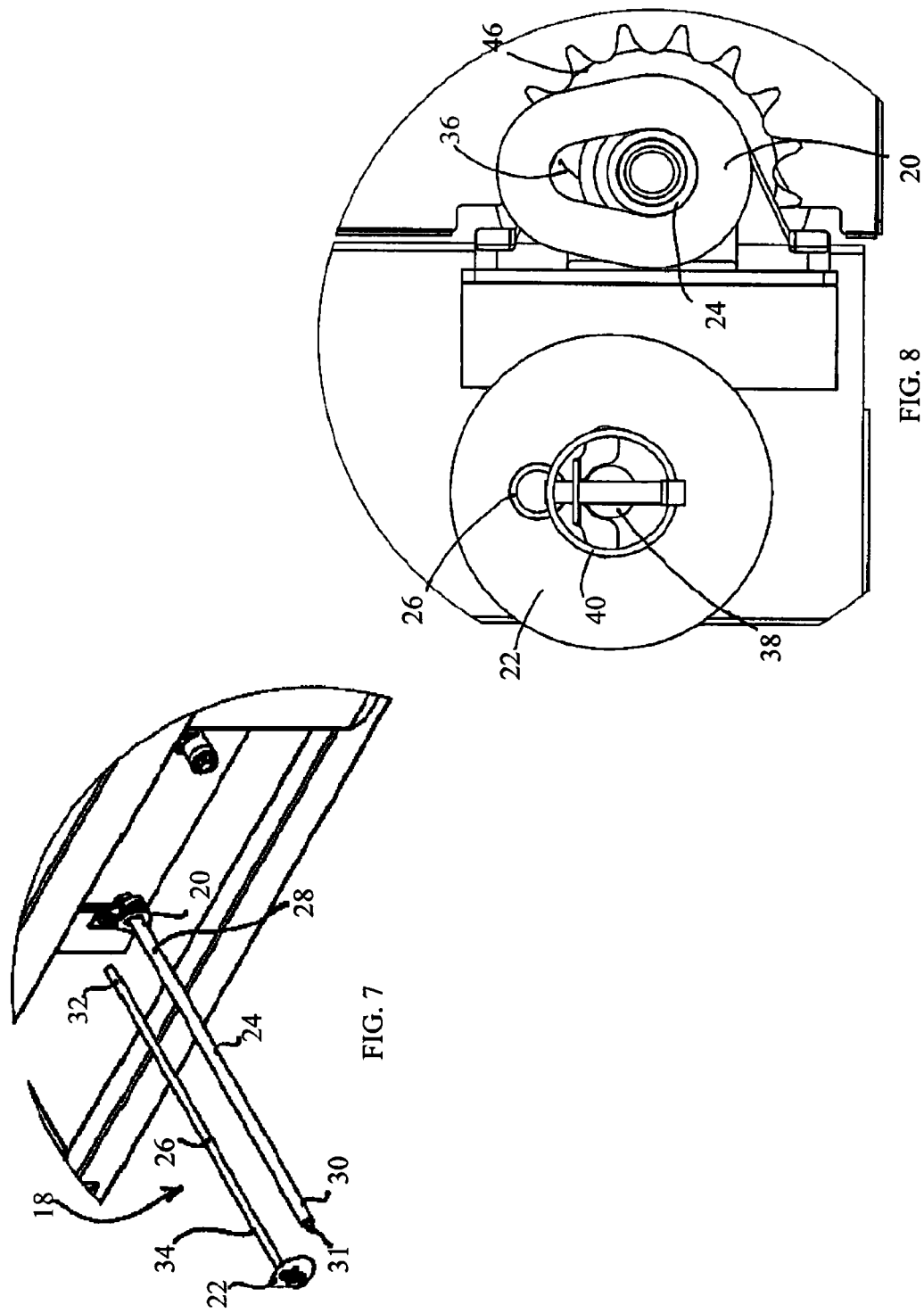

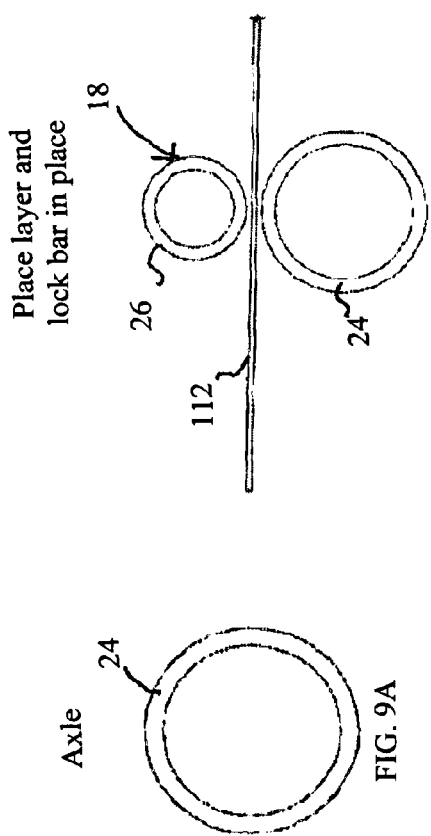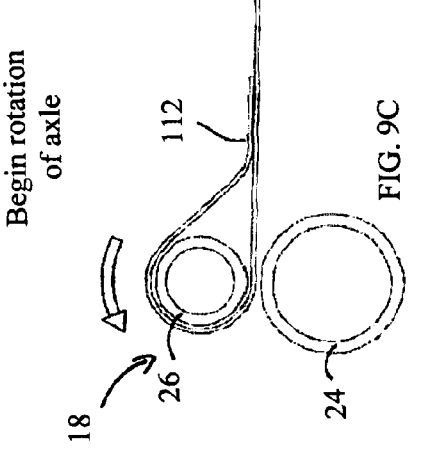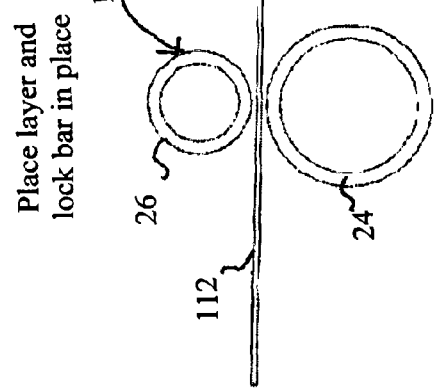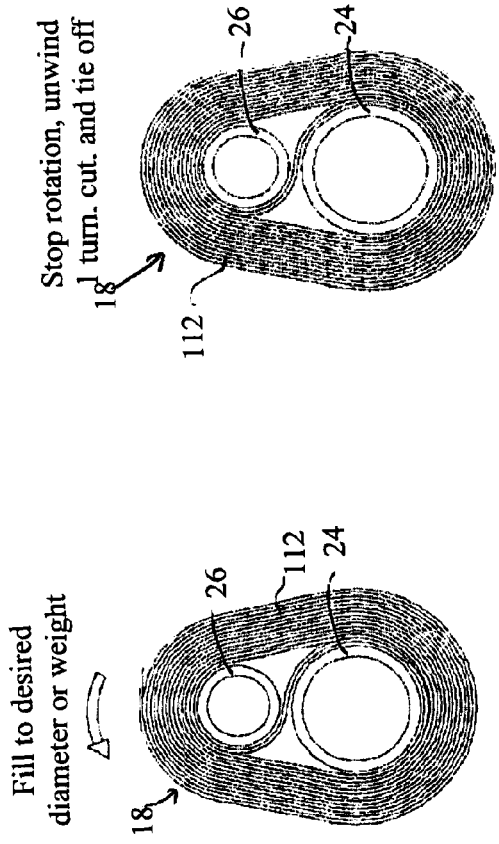

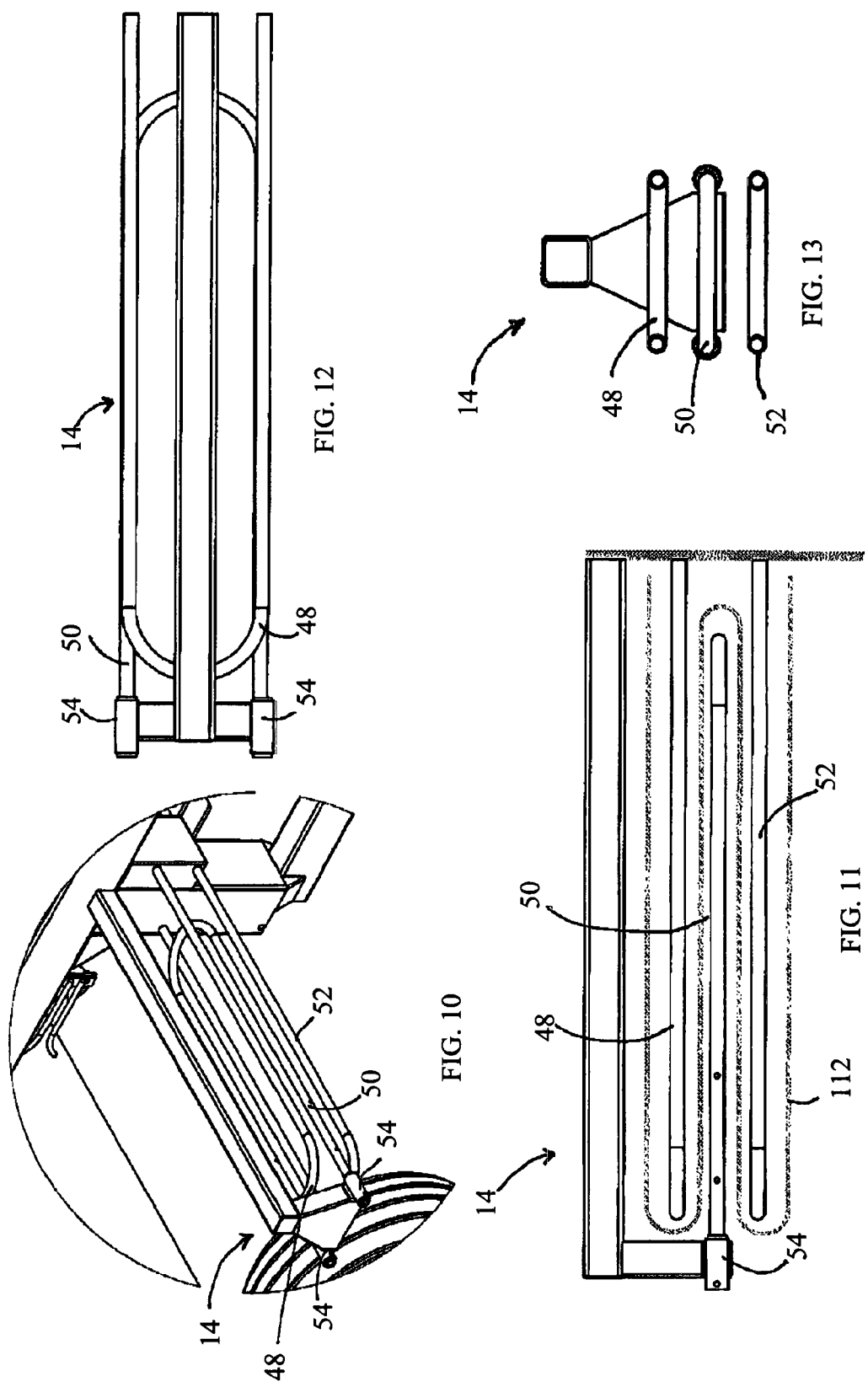

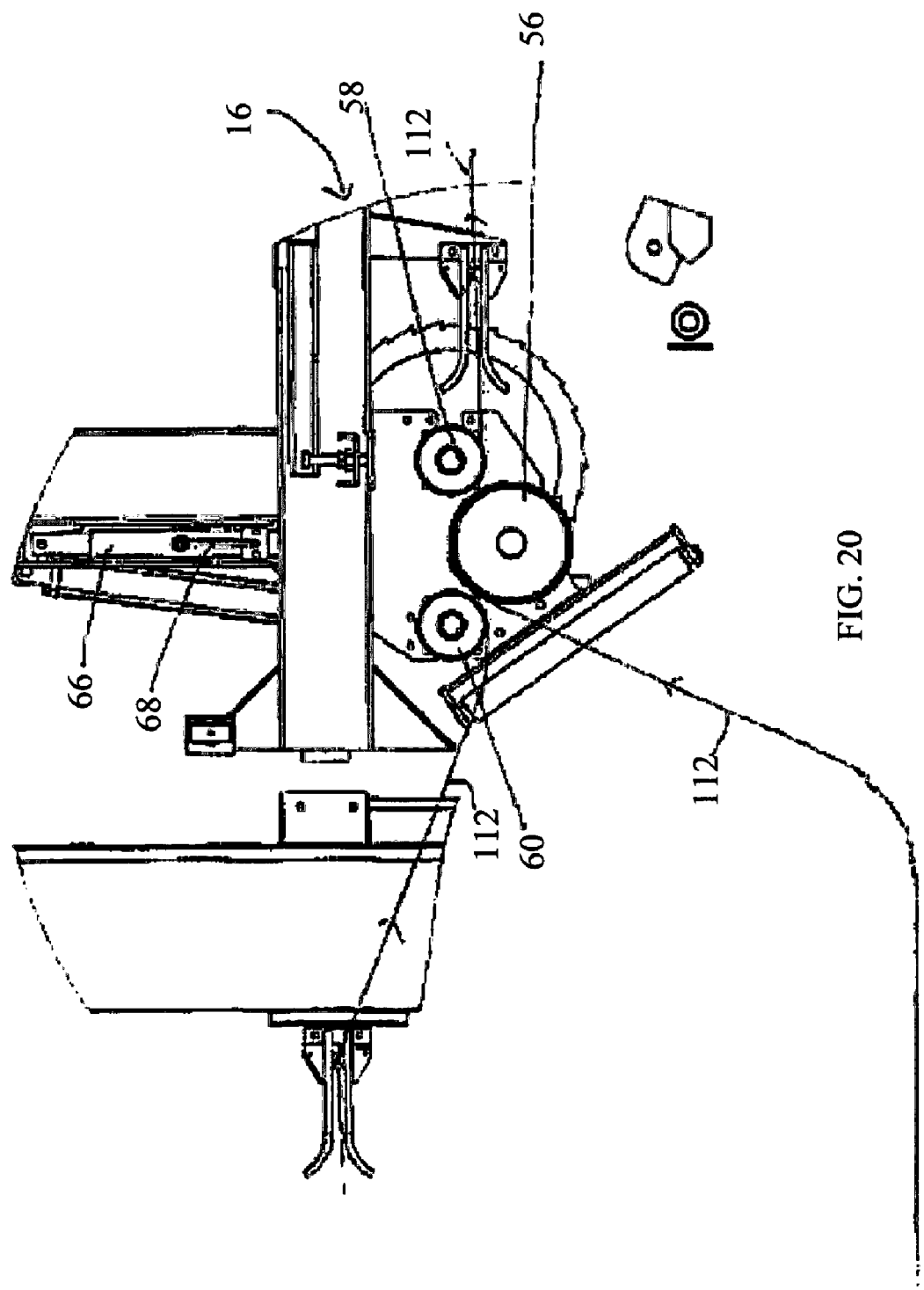

BAG HANDLING ASSEMBLY FOR A GRAIN BAG UNLOADING APPARATUS

FIELD

A bag handling assembly which handles a grain bag during a grain bag unloading process.

BACKGROUND

Grain bag unloading apparatus that unload grain bags are known in the art. They are similar in the manner in that they all have grain auger configurations which have an input end inserted into a grain bag and a remote output end. They differ in the manner that the grain bag is fed into and flows through the apparatus. Some grain bag unloading apparatus insert one end of the grain bag into the apparatus and draw the grain bag into an interior of the apparatus as the grain bag unloading apparatus advances. Other grain bag unloading apparatus position the grain bag externally and drive over the grain bag as the grain bag unloading apparatus advances.

SUMMARY

There is provided a grain bag handling assembly for a grain bag unloading apparatus having an auger assembly with an input end which is inserted into a mouth of an elongated grain bag and a remote output end. The grain bag handling assembly has a unique bag feeding assembly. A feed mouth is provided that is smaller than the width of the grain bag. Guide rollers are provided to guide the grain bag into the feed mouth. A hold down frame is provided to hold down a bottom of the grain bag. A bag driver applies a force to move the grain bag through the feed mouth.

The bag feeding assembly, as described above, provides a number of advantages. The narrow feed mouth facilitates a controlled collection of large volumes and various widths of plastic. The guide rollers allow the bag to be drawn into the narrow feed mouth without damaging the integrity of the grain bag. The hold down frame controls the flow of plastic from the grain bag under the auger system, protecting the integrity of the bag from being damaged by rotating components of the auger system. The bag driver pulls the grain bag through the feed mouth. Although beneficial results may be obtained by just using the above described components, even more beneficial results may be obtained by positioning a top knife prior to the feed mouth to cut open a top of the grain bag as it is drawn into the feed mouth. Even more beneficial results may be obtained when one of the guide rollers is a lift roller to raise the grain bag as it passes through the feed mouth. By lifting the grain bag floor vertically, grain is caused to fall toward the auger system, which empties the grain bag of grain prior to passing through the feed mouth. Even more beneficial results may also be obtained by providing end guards that controls the flow of plastic from the grain bag around the ends of the auger system.

The bag feeding system, as described above, can be used with any bag drive system. After experimenting with various bag drive systems, including pinch roller configurations, it is preferred that a combination bag drive and collection assembly be used. With this bag drive and collection assembly the grain bag is wound onto a driven spool. The driven spool provides the force to draw the grain bag through the feed mouth. The most effective bag drive and collection assembly has a bottom knife provided to cut a bottom of the grain bag as it exits the bag feeding assembly, with the grain bag being wound onto two spaced apart driven rollers. It is preferred, but not essential, that the driven rollers be driven by an hydraulic ratchet system. The hydraulic ratchet system provides enough force to pull the apparatus forward as the grain bag is emptied. The use of hydraulic cycling valves triggers operation of the ratchet system. The use of flow control valves allows the operator to control the speed at which the apparatus moves forward, thereby controlling the flow of material through the apparatus.

The bag drive and collection assembly, can be further improved by additional features. One feature is the use of a spool that has two cooperating components that allows it to be taken apart for the purpose of removing plastic that has become wound upon it. Another feature is the provision of a bag folding assembly for folding the grain bag into layers in a controlled fashion.

There are further improvements that can be incorporated into the design of the apparatus. Beneficial results may be obtained through the use of a drop axle configuration, which can be rotated to change the operating height of the apparatus. This allows the apparatus to have a raised transport position and a lowered operating position. Similarly, it is preferred that the auger discharge system have a lowered transport position and a raised operating position. This is accomplished by having a transport position parallel to the frame of the apparatus, as the auger is rotated from the transport position it is mounted on a swivel plate and raises vertically to an operative position.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein:

FIG. 1 is a front elevation view of a grain bag unloading apparatus having a grain bag handling assembly.

FIG. 2 is a top plan view of the grain bag unloading apparatus illustrated in FIG. 1.

FIG. 3 is a side elevation view of the grain bag unloading apparatus illustrated in FIG. 1.

FIG. 4 is a perspective view of a spool assembly and associated drive motor for a grain bag handling assembly for use in the grain bag unloading apparatus illustrated in FIG. 1.

FIG. 5 is a side elevation view of the spool assembly and associated drive motor illustrated in FIG. 4.

FIG. 6 is a detailed end elevation view of the spool assembly illustrated in FIG. 4.

FIG. 7 is an exploded perspective view of the spool assembly illustrated in FIG. 4.

FIG. 8 is an end elevation view of the exploded spool assembly illustrated in FIG. 7.

FIG. 9A-9F are each end elevation views illustrating step by step the use of the spool assembly illustrated in FIG. 4 through 8.

FIG. 10 is a perspective view of a bag folding assembly forming part of the grain bag handling assembly for use in the grain bag unloading apparatus illustrated in FIG. 1.

FIG. 11 is a side elevation view of the bag folding assembly illustrated in FIG. 10.

FIG. 12 is a top plan view of the bag folding assembly illustrated in FIG. 10.

FIG. 13 is an end elevation view of the bag folding assembly illustrated in FIG. 10.

FIG. 20 is an end elevation view, in section, of the bag feeding assembly illustrated in FIG. 17.

DETAILED DESCRIPTION

Figure 15:
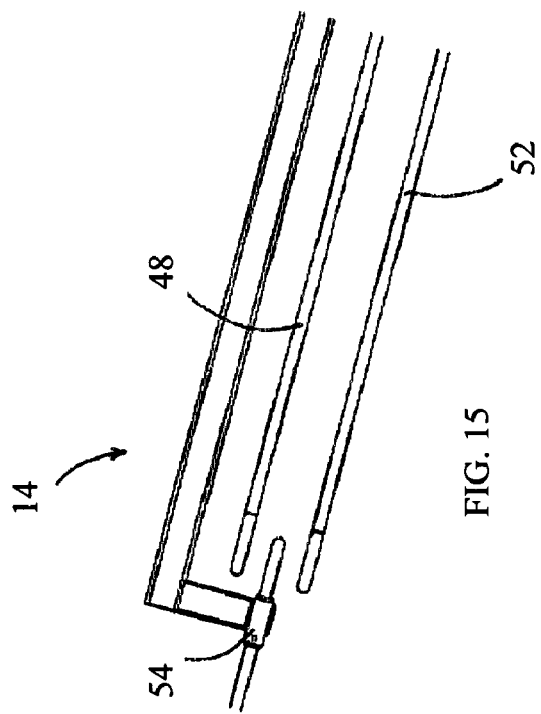
FIG. 15 is a side elevation view of the bag folding assembly illustrated in FIG. 14.

A grain bag handling assembly generally identified by reference numeral 10, will now be described with reference to FIG. 1 through 27 and 36 through 40 Some variations will be described with reference to FIG. 28 through 40.

Structure and Relationship of Parts:

Referring to FIG. 2, grain bag handling assembly 10 is intended for use in a grain bag unloading apparatus 100 having an auger assembly generally indicated by reference numeral 102. Referring to FIG. 1 through 3, augers 104 and 106 serve as the input end of auger assembly 102. Auger 104 is a horizontal auger positioned normal to the direction of travel of grain bag unloading apparatus 10, the role of which is to draw grain into vertical auger 108. Preferably, auger 104 is able to fold up for transport, and may have interchangeable sections to allow for different bag diameters. Auger 106 is forwardly directed and is inserted into a mouth of an elongated grain bag. It also serves to feed grain to vertical auger 108. It will be understood that various auger arrangements may be used. For example, referring to FIG. 37, auger 106 is not used. Vertical auger 108 conveys grain to unloading swing auger 110, which serves as a remote output end for auger assembly 102. Referring to FIGS. 37 and 38, auger 110 is mounted on an angular, pivoting bearing plate 109 that is driven by a hydraulic actuator 111 (also shown in FIG. 36) that allows it to be swung from the lowered transport position shown in FIG. 37 where it is supported by a support 113 in line with the assembly 10 and apparatus 100 and to the side of grain bag unloading apparatus 100 as shown in FIG. 38. To suit unloading requirements, auger 110 may be swung to either side. As auger 110 travels through the rotational radius, the discharge point of auger 110 increases vertically toward the discharge operating position. Hydraulic actuator 111 may also be used while filling to minimize truck movement.

Figure 36:
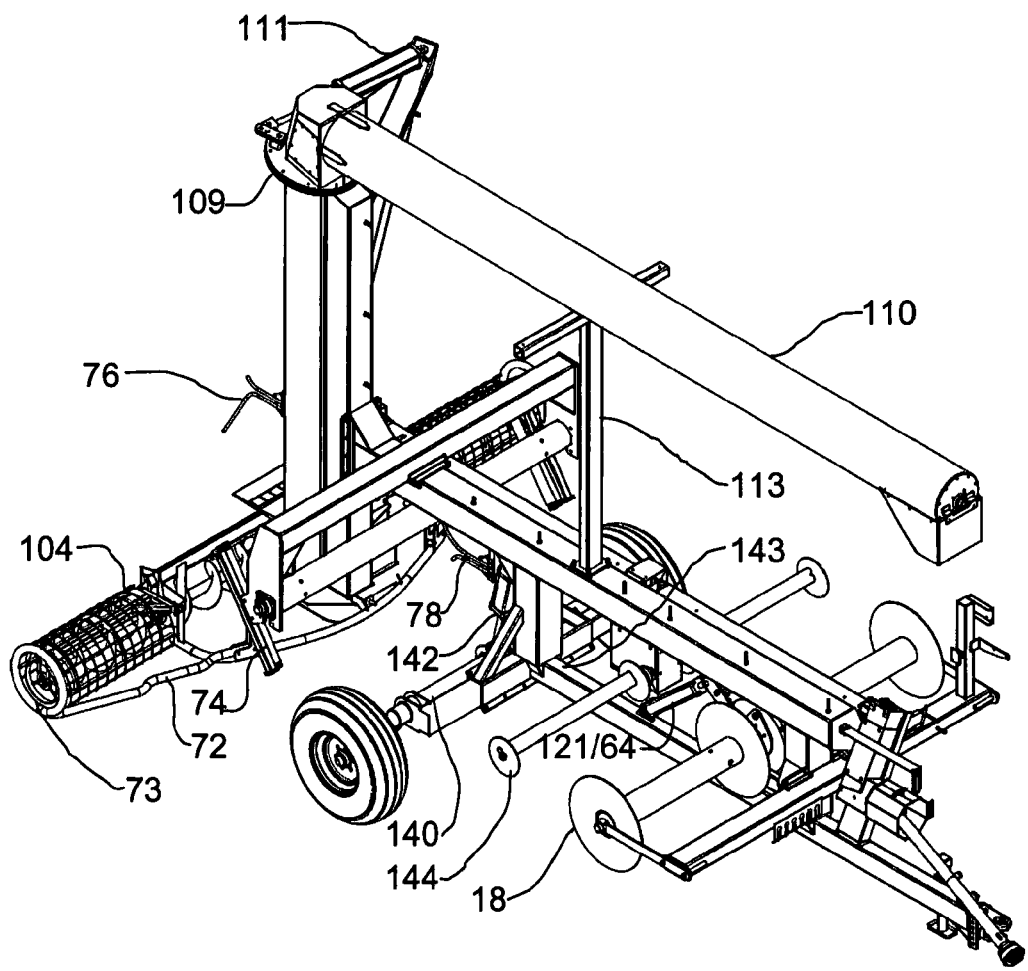
FIG. 36 is a rear perspective view of the grain bag handling assembly in the transport position
Figure 37:
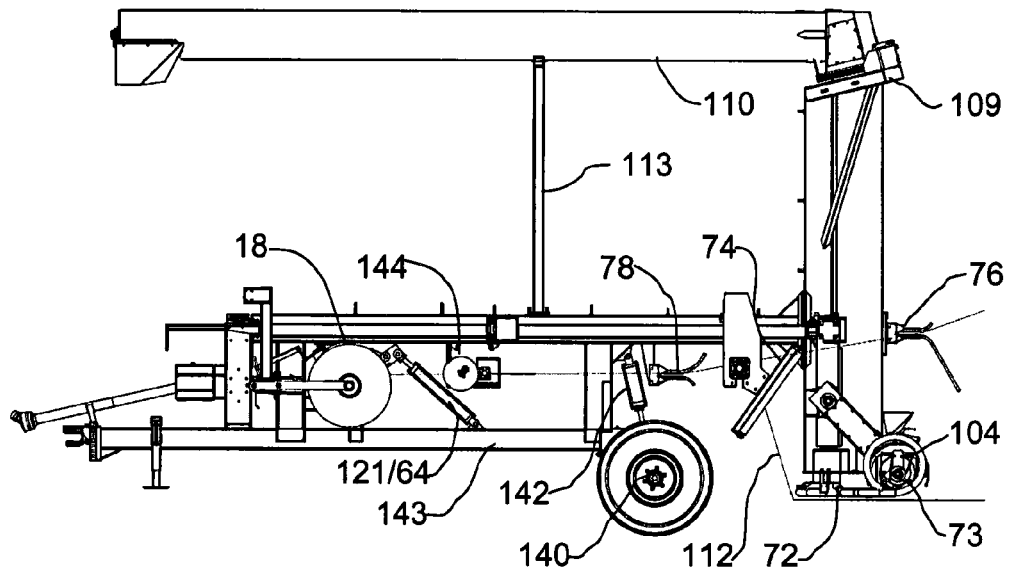
FIG. 37 is a side elevation view of the grain bag handling assembly in the transport position.
Figure 38:
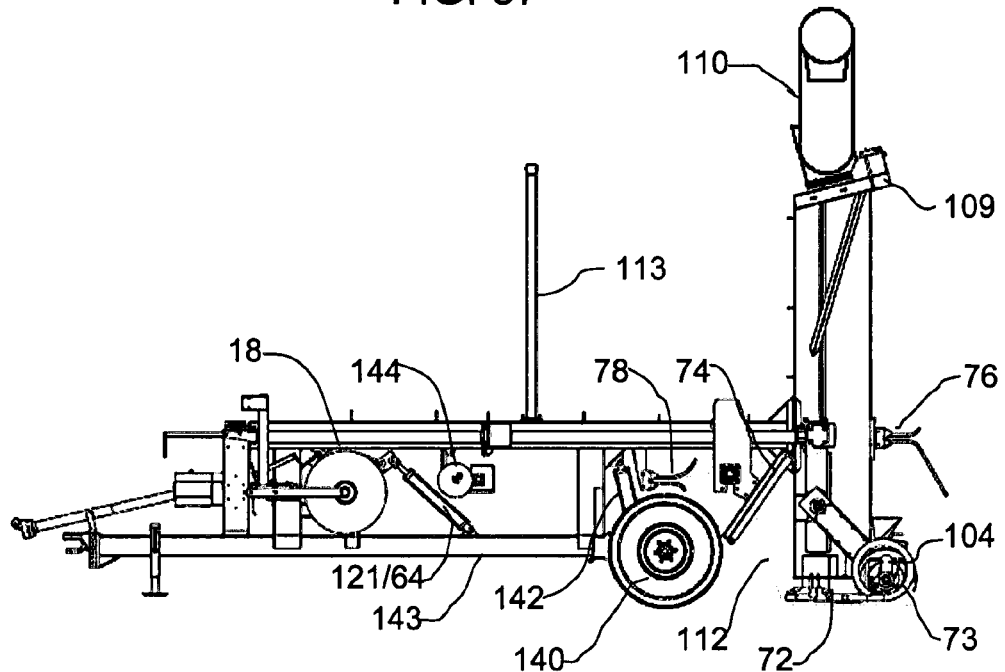
FIG. 38 is a side elevation view of the grain bag handling assembly in the operative position.

Referring to FIG. 36, bag unloading apparatus 100 may also be equipped with a lift axle 140 that allows it to be moved from a transport position shown in FIG. 37 to an operative position shown in FIG. 38. Lift axle 140 as shown in FIG. 36 is moved by a hydraulic cylinder 142. Lift axle 140 allows the chassis 143 apparatus 100 to be lifted to provide clearance for transportation or to be positioned over a bag, and then lowered such that auger 104 is lowered onto the bag to begin the unloading process.

Referring to FIG. 2, grain bag handling assembly 10 includes a spool assembly 12, which will hereafter be described in more detail with reference to FIG. 4 through FIG. 9F and a bag folding assembly 14, which will hereafter be described in more detail with reference to FIG. 10 through FIG. 16. Although the system can operate without bag folding assembly 14 or bag feeding assembly 16, it is preferred in some circumstances that some or all of the features of bag folding assembly 14 or bag feed assembly 16 be utilized, particulars of which will hereinafter be further described with reference to FIG. 10 through 16 and FIG. 17 through FIG. 21, respectively. For example, as an alternative to the folding assembly 14, there may be other types of bag collection assemblies, such as an assembly that collects the bag on a spool. In addition, the bag collection assembly may also be used as the driver, or bag feeding assembly, as the bag collection assembly pulls on the bag. The system may also be designed to operate without a bag collection assembly, where the bag feeding assembly 16 deposits the bag on the ground for collection at a later time. Each of these assemblies will now be described in greater detail.

Spool Assembly 12

Referring to FIG. 4 spool assembly 12 includes a rotatably mounted spool 18 onto which a grain bag 112 is rolled, as will hereinafter be further described with reference to FIG. 9A through 9F. Referring to FIG. 7, spool 18 has a first end flange 20 and a second end flange 22. Spool 18 has more than one central support member, in the illustrated embodiment two have been shown a relatively large first support member 24 and a relatively small second support member 26. Second support member 26 is secured to and removable with second end flange 22. Referring to FIG. 9E, by removing second end flange 22, access can be obtained for the purpose of removing grain bag 112. Referring to FIG. 9F, removal of second support member 26 along with second end flange 22 is even better, as it leaves clearance to make easier the removal of rolled portion of grain bag 112 from spool 18. Referring to FIG. 7, first support member 24 has a first end 28 and a second end 30, with a reduced diameter male coupling 31 positioned at second end 30. Second support member 26 has a first end 32 and a second end 34. First end flange 20 is secured to first end 28 of first support member 24. Referring to FIG. 8, first end flange 20 has a first female receiver 36 to receive first end 32 of second support member 26. Referring to FIG. 7, second end flange 22 is secured to second end 34 of second support member 26. Referring to FIG. 6, second end flange 22 has a second female receiver 38 to receive a reduced diameter male coupling at second end 30 of first support member 24. A locking clamp 40 is associated with second receiver 38. Locking clamp 40 engages male coupling 31 to prevent second end 30 of first support member 26 from being removed from second female receiver 38. This prevents relative separation of first end flange 20 and second end flange 22 and keeps spool 18 in the configuration illustrated in FIG. 4. However, upon locking clamp 40 being released, movement of second end flange 22 away from first end flange 20 draws away second support member 26 permitting separation. This leaves central clearance to make easier the removal of the rolled portion of grain bag 112 from first support member 24, as can be noted by a comparison of FIG. 9E and FIG. 9F. Referring to FIG. 4 and FIG. 5, spool 18 is rotatably mounted, with the motive force to rotate spool 18 being provided by a drive mechanism 42, connected to spool 18 by a continuous drive chain 44 which moves around toothed gears 46. It is preferred that there be two spools 18 with each of the spools 18 being rotated by a centrally positioned shared drive mechanism 42.

Bag Folding Assembly 14

Figure 16:
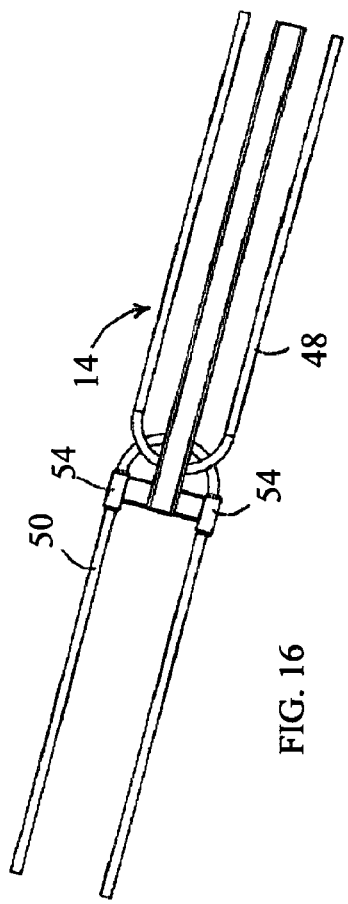
FIG. 16 is a top plan view of the bag folding assembly illustrated in FIG. 10.
Figure 14:
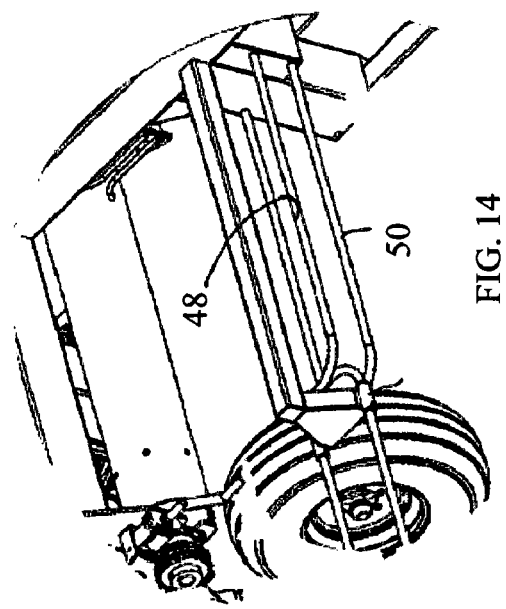
FIG. 14 is a perspective view of the bag folding assembly illustrated in FIG. 10, with a middle flow path disruptor withdrawn to facilitate insertion of a grain bag.

Referring to FIG. 10 through 13, bag folding assembly 14 has at least one planar flow path disruptor to disrupt the passage of grain bag 112, forcing grain bag 112 to fold around the flow path disruptor as it passes on its way to spool 18 (which is not shown in this view). In the illustrated embodiment three vertically spaced parallel flow path disruptors 48, 50 and 52 have been illustrated. These flow path disruptors 48, 50, and 52 create three folds in grain bag 112 as it passes through bag folding assembly 14. They are shown as being "U" shaped members. It will be understood that other configurations could be used. The "U" shaped members are convenient as they are lighter in weight than a plate structure would be. The "U" shaped configuration also facilitates movement, as will hereinafter be further described. Flow path disruptors 48 and 52 are fixed in their positions, supported in cantilever fashion from one end. Referring to FIG. 14 through 16, flow path disruptor 50, the middle one of the three vertically spaced parallel flow path disruptors, is removable to the extent that it slides out of the way to facilitate positioning of grain bag 112 prior to activation. Flow path disruptor 50 is opposed to flow path disruptors 48 and 52, in the sense that it extends toward them from an opposed direction. Flow path disruptor 50 is also supported in cantilever fashion, but is held by sleeves 54, enabling it to be selectively slid in and out of the flow path. The configuration illustrated takes a grain bag having an approximate width of 26 feet and folds it in preparation for rolling upon a roller having an approximately span of 8 feet.

In some circumstances, it is not necessary to use bag folding assembly 14, for example, for bags of a smaller diameter. In those situations, and when bag feed assembly 16 is not used, the width of the feed mouth opening 70 is sufficient to cause the width of the bag material to reduce to a sufficient size. There may also be an initial fold onto spool 18 that reduces the bag material as well. Bag folding assembly 14 is found to be particularly useful for bags of a larger diameter.

Bag Feed Assembly 16

Figure 18:
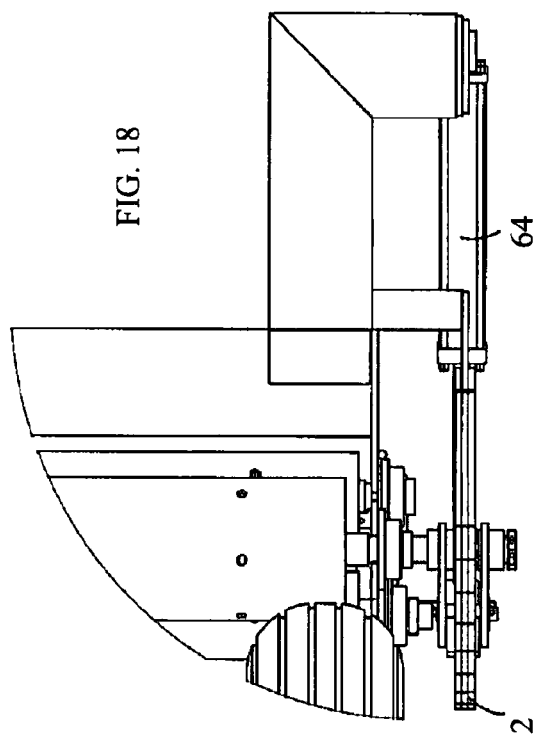
FIG. 18 is a top plan view of the bag feeding assembly illustrated in FIG. 17.
Figure 17:
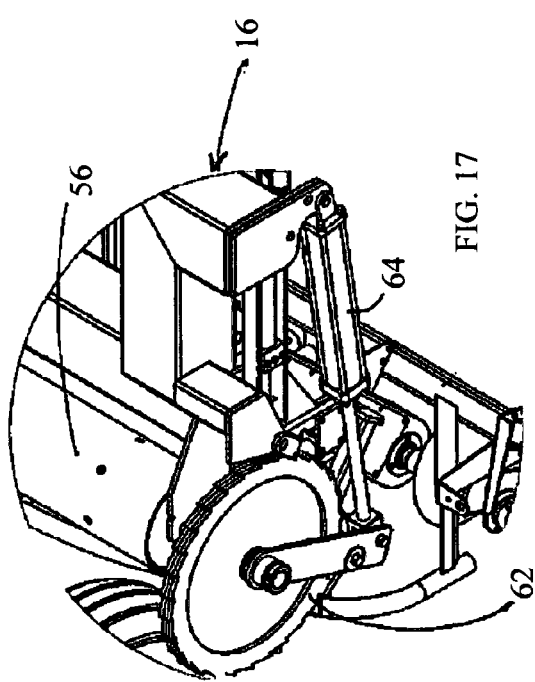
FIG. 17 is a perspective view of an optional bag feeding assembly forming part of the grain bag handling assembly for use in the grain bag unloading apparatus illustrated in FIG. 1.
Figure 19:
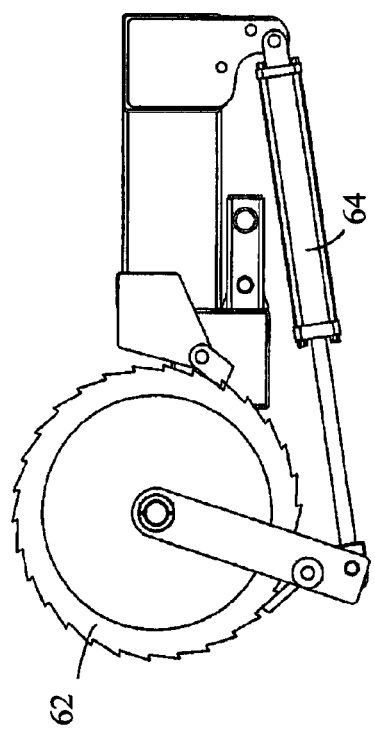
FIG. 19 is a detailed end elevation view of the ratchet forming part of the bag feeding assembly illustrated in FIG. 17.
Figure 22:
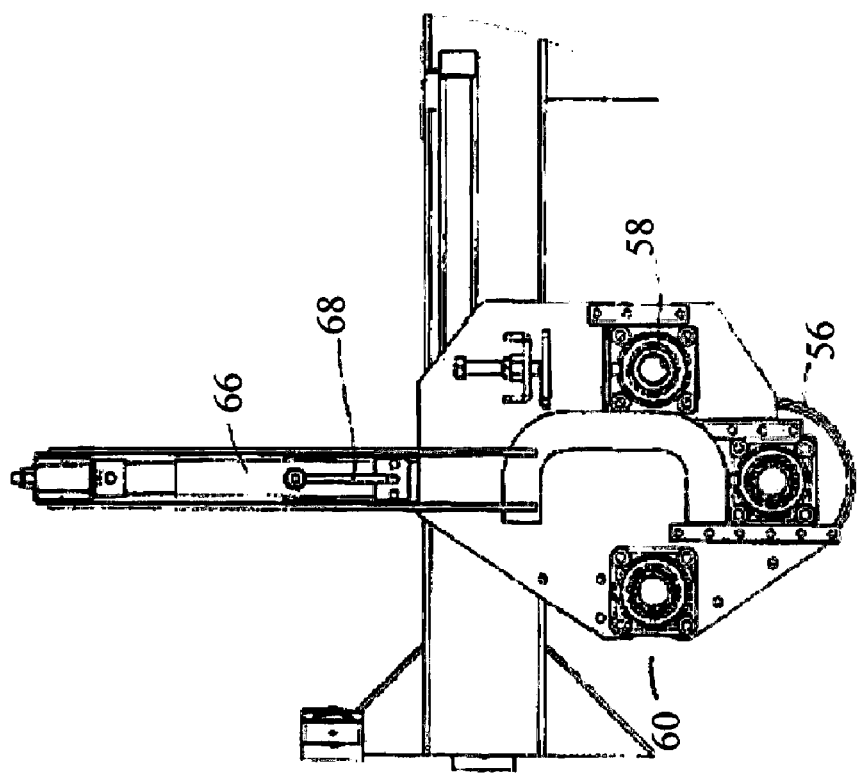
FIG. 22 is an end elevation view of the roller tensioning apparatus illustrated in FIG. 21.
Figure 21:
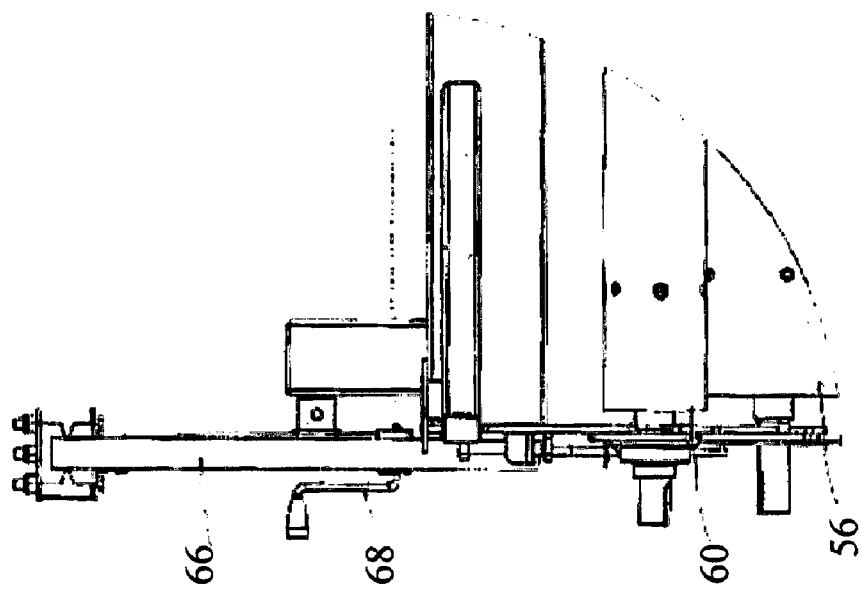
FIG. 21 is a side elevation view of a roller tensioning apparatus for the bag feeding assembly forming part of the grain bag handling assembly for use in the grain bag unloading apparatus illustrated in FIG. 17.
Figure 25:
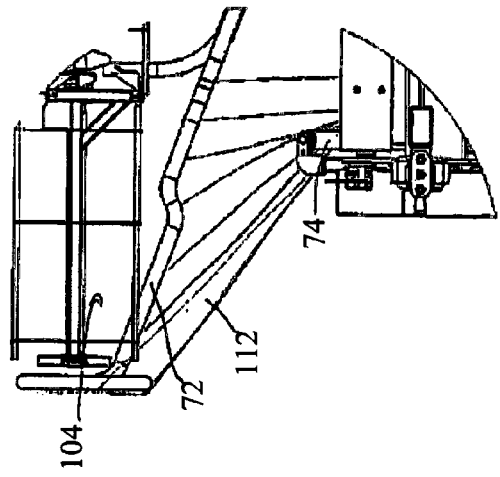
FIG. 25 is a top plan view of the hold down frame and guide rollers illustrated in FIG. 23.
Figure 26:
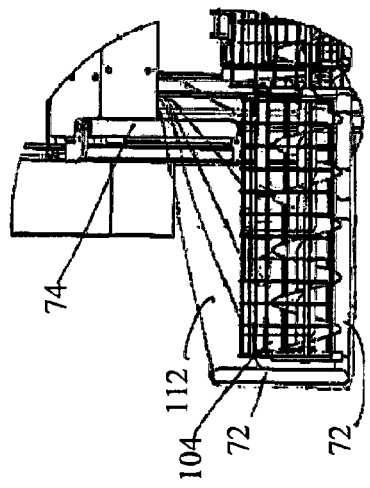
FIG. 26 is a front elevation view of the hold down frame and guide rollers illustrated in FIG. 23.
Figure 23:
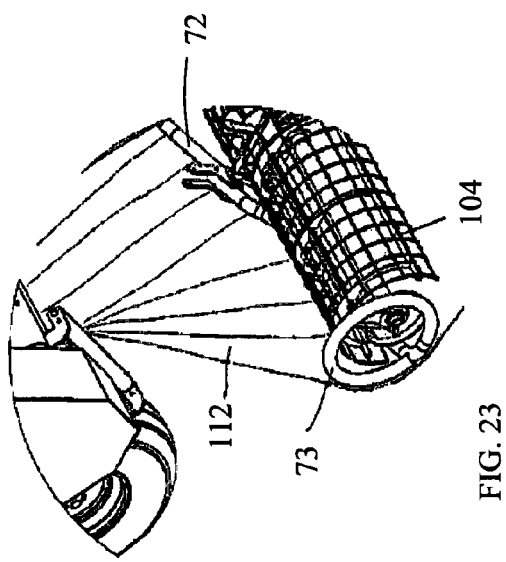
FIG. 23 is a perspective view of hold down frame and guide rollers guiding the grain bag into a feed mouth leading to the gripping rollers of the bag feeding assembly.
Figure 24:
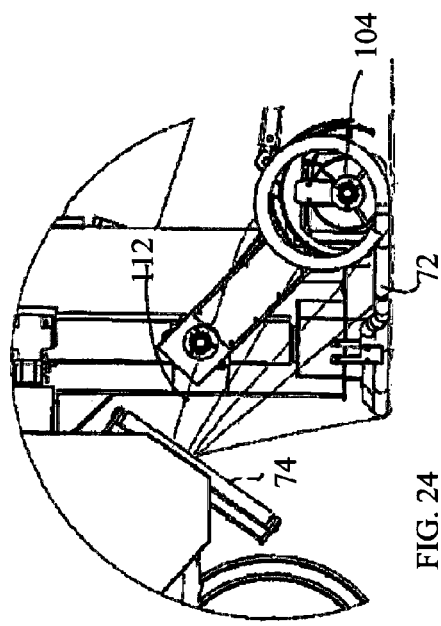
FIG. 24 is a side elevation view of the hold down frame and guide rollers illustrated in FIG. 23.
Figure 40:
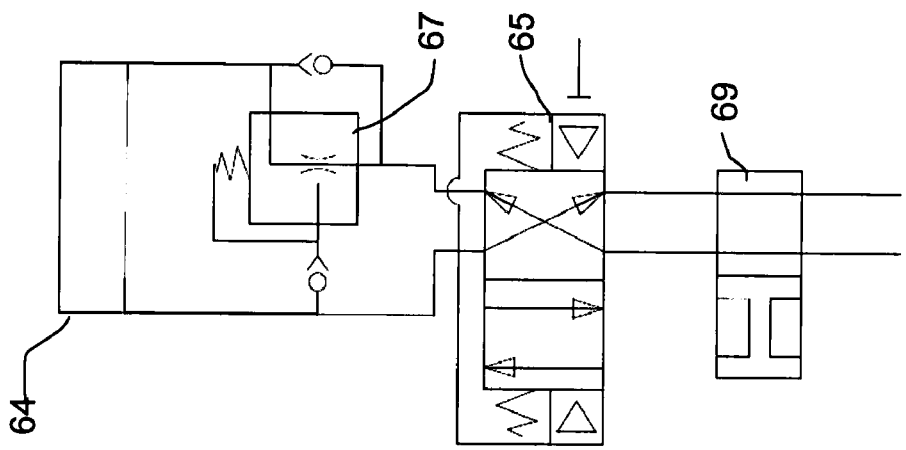
FIG. 40 is a schematic of the hydraulic control system.
Figure 39:
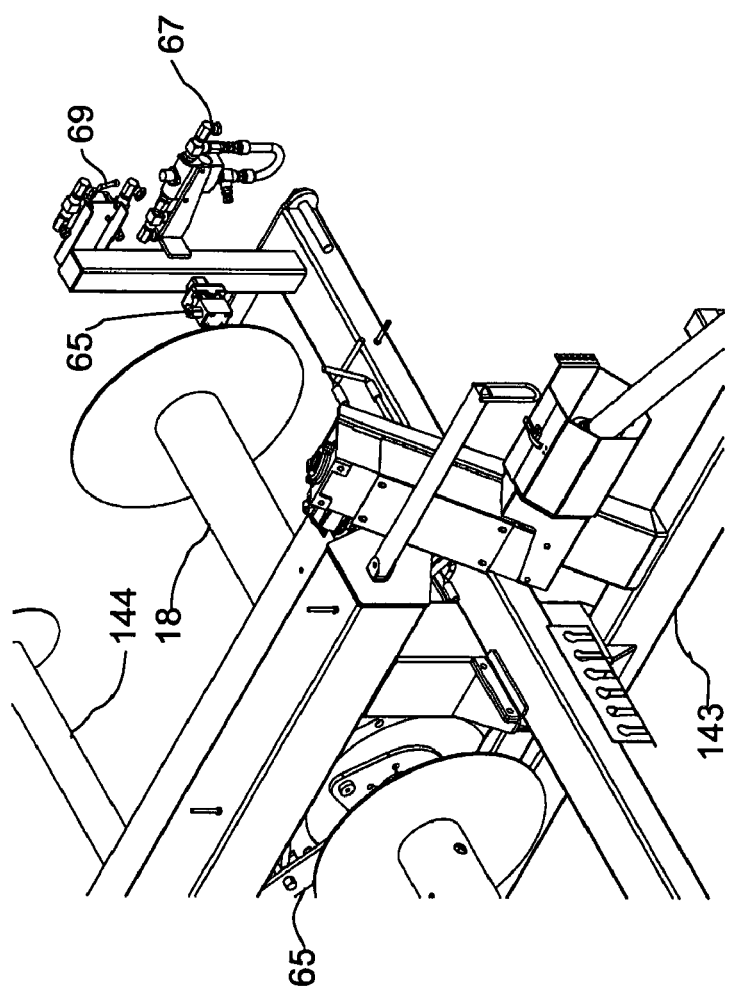
FIG. 39 is a detailed perspective view of the hydraulic control system.

Referring to FIG. 14, bag feeding assembly feeds grain bag 112 into bag folding assembly 14. Referring to FIG. 20, bag feeding assembly has three gripping rollers, a primary roller 56 and two secondary rollers 58 and 60 for gripping grain bag 112. Primary roller 56 is larger than secondary rollers 58 and 60. Rollers 56, 58 and 60 are elevated above where the bag 112 comes out from under auger 104 as shown in FIGS. 20 and 24, which allows the bag 112 to be lifted vertically. This causes any grain remaining on bag 112 to fall forward into the auger assembly 102 prior to the bag 112 being collected on spool assembly 12 as described above. Referring to FIG. 17 through 19, primary roller 56 has a ratchet drive 62. Ratchet drive 62 is driven by a hydraulic actuator 64. Referring to FIGS. 39 and 40, hydraulic actuator 64 is controlled by a hydraulic cycling valve 65. In the depicted embodiment, hydraulic cycling valve 65 is used to activate an automatic reversing function at the end of each stroke of actuator 64. A flow control valve 67 allows the user to stop or adjust the amount of bag material being pulled toward spool 18. A shutoff valve 69 is also provided. This controls both the flow of bag material and the ground speed of the grain bag unloading apparatus 100 as it is pulled into grain bag 112. As shown in FIG. 17 through 19, ratchet drive 62 rotates primary roller 56, in one direction and prevents any back slippage. Secondary roller 58 and secondary roller 60 control the inflow of grain bag 112 into primary roller 56, to ensure as much surface area as possible of primary roller 56 is in contact with grain bag 112. Primary roller 56 serves to drive secondary roller 58 and secondary roller 60. This provides a dual driven pinch point for grain bag 112 between primary roller 56 and secondary roller 60, and between secondary roller 58 and primary roller 56. Referring to FIGS. 21 and 22, in order to accommodate bunching, primary roller 56 and secondary rollers 58 and 60 are biased by spring tension toward each other by a spring assembly 66. The force exerted by spring assembly 66 is adjustable by means of a tensioning crank 68. Spring assembly 66 pushes upon the axles about which secondary rollers 58 and 60, urging primary roller 56 toward secondary rollers 58 and 60.

Referring to FIG. 1, it is to be noted that a feed mouth 70 through which grain bag 112 must pass on its way to bag feeding assembly 16 is between one third and one half of the width of the grain bag. However, this system has no difficulty in accommodating many sizes of grain bag. Grain bags come in diameters of 12 feet, ten feet, and eight feet. A grain bag with a diameter of 12 feet will have a circumference of approximately 38 feet, and a "lay flat" width that is calculated as being approximately one half of the circumference or approximately 19 feet.

Figure 27:
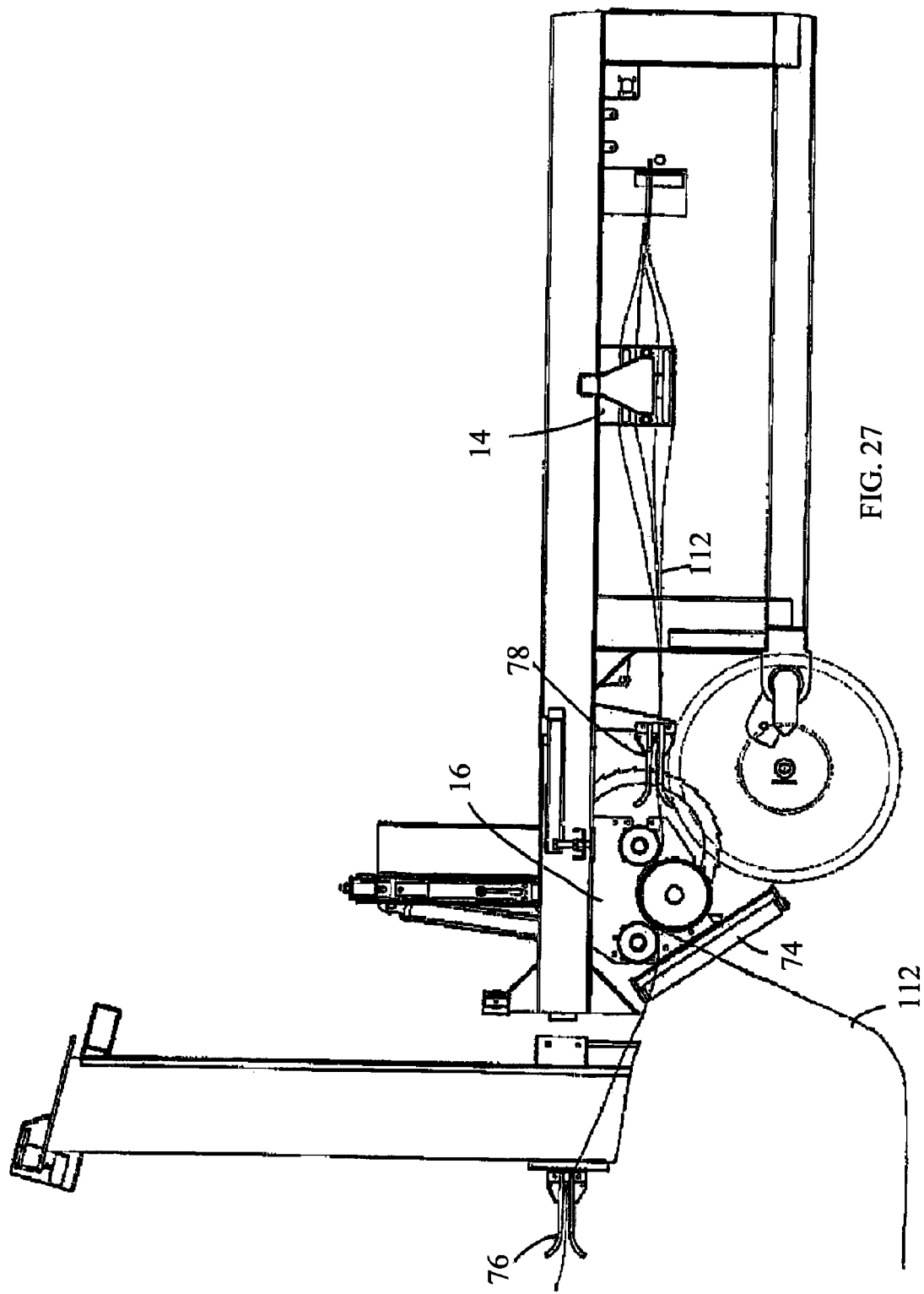
FIG. 27 is a side elevation view of the bag feeding assembly and grain bag folding assembly showing the positioning of the top knife and the bottom knife.

Referring to FIG. 23 through 26, there is illustrated the manner in which grain bag 112 is guided into feed mouth 70 leading to gripping rollers 56, 58, and 60. In order to control the bottom of grain bag 112 a hold down frame 72 and end guards in the form of hold out rings 73 are positioned in the vicinity of horizontal auger 104. In the illustrated embodiment hold down frame 72 is made of pipe and extends the length of horizontal auger 104. Hold down frame 72 and hold out rings 73 are preferably made interchangeable with auger 104 as discussed above. Hold down frame 72 and hold out rings 73 provide a path for grain bag 112 to pass under and around horizontal auger 104. In order to bunch grain bag 112 to fit feed mouth 70 and to protect the integrity of the bag 112, guide rollers 74 are positioned on opposed sides of feed mouth 70. Referring to FIG. 27, it has been determined that it is easier to handle grain bag 112, if grain bag 112 is cut. A top knife 76 is positioned prior to feed mouth 70 to cut open a top of grain bag 112 as it is drawn into feed mouth 70. The operation of top knife 76 is made easier by the fact that grain bag is held down by hold down frame 72 and held out by hold out rings 73. Hold down frame 72 and hold out rings 73 control the flow of the plastic grain bag 112 under and around the auger assembly 102 to protect bag 112 from being damaged. In addition, a bottom knife 78 is provided to cut a bottom of grain bag 112 as it exits bag feeding assembly 16 on its way to grain bag folding assembly 14.

Operation

Referring to FIG. 1 through 3, in operation horizontal auger 104 and forwardly directed auger 106 are inserted into a mouth of a grain bag. Auger assembly 102 is then activated to draw grain into forwardly directed auger 106 and horizontal auger 104 at input end of auger assembly 102, which both feed vertical auger 108 for discharge through discharge auger 110. It will be apparent that the configuration of auger assembly 102 is not critical to the invention and can vary from that illustrated. As grain is removed, grain bag unloading apparatus 10 moves forward, until surplus material from grain bag 112 becomes an impediment. Referring to FIG. 20, the surplus material of grain bag 112 is then threaded onto primary roller 56 and secondary rollers 58 and 60 of grain bag feeding assembly 16. Grain bag 112 is guided into feed mouth 70 leading to gripping rollers 56, 58, and 60. Referring to FIG. 23 through 26, hold down frame 72 provides a path for grain bag 112 to pass under and clockwise around horizontal auger 104. Grain bag 112 is guided into relatively narrow feed mouth 70 by guide rollers 74 which are positioned on opposed sides of feed mouth 70. Referring to FIG. 27, top knife 76, which is positioned prior to feed mouth 70, cuts open a top of grain bag 112 as it is drawn into feed mouth 70. The operation of top knife 76 is made easier by the fact that grain bag 112 is held down by hold down frame 72. As grain bag 112 exits bag feeding assembly 16 on its way to grain bag folding assembly 14, a bottom knife 78 is provided to cut a bottom of grain bag 112. This enables grain bag to be divided into two portions, with each portion being rolled onto a separate spool 18. FIG. 36 shows an example of spools 18 that are used to wind the two portions of grain bag 112. As shown, spools 18 are in axial alignment, and are each driven by a drive mechanism 121 positioned between them, such as the hydraulic drive mechanism described below.

Referring to FIG. 15, in order to make grain bag 112 more managable, it is passed through grain bag folding assembly 14, which can be considered a type of pull through die. FIG. 15, illustrates how grain bag 112 is positioned within grain bag folding assembly 14. Movable flow path disruptor 50 is moved out of the way while bag is folded in half and threaded over fixed flow path disruptors 48 and 52. Referring to FIG. 11, movable flow path disruptor 50 is then pushed back into position forcing grain bag 112 into a serpentine profile that has three folds. Referring to FIG. 9A, second support member 26 is removed from spool 18 of spool assembly 12 and grain bag 112 is laid over first support member 24. Referring to FIG. 9B, second support member 26 is then secured in position. As can be seen, second support member 26 may also act as a lock bar to lock grain bag 112 against first support member 24. Referring to FIGS. 7 and 8, first end 32 of second support member 26 is inserted into first female receiver 36 on first end flange 20, second end 30 of first support member 24 is inserted into second female receiver 38 of second end flange 22. First support member 24 and second support member 26 are then locked together by engaging locking clamp 40 with male coupling 31 at second end 30 of first support member 24. Referring to FIG. 17, ratchet drive 62 is used to draw surplus grain bag into grain bag feeding assembly 16. Referring to FIG. 20, grain bag 112 passes over and around primary roller 56 following a path dictated by secondary rollers 58 and 60. Differences in thickness due to bunching of grain bag 112 are accommodated by spring assembly 66, with adjustments being made manually, as required, via adjustment crank 68. The operation of primary roller 56 and secondary rollers 58 and 60 serves to assist in moving grain bag unloading apparatus 10, as the rollers tend to draw grain bag unloading apparatus 10 forward. As grain bag 112 exits bag feeding assembly 16, it experiences a pulling force. Referring to FIG. 5, this pulling force is exerted as a result of a rotation of spool 18 of spool assembly 12 by drive motor 42 via drive chain 44. Referring to FIG. 14, as grain bag 112 passes from grain bag feeding assembly 16 toward the spool assembly 12 (not shown in this view) it encounters grain bag folding assembly 14. Referring to FIG. 11, grain bag 112 is folded by flow path disruptors 48, 50 and 52 as it passes through grain bag folding assembly 14. Referring to FIG. 9C through 9D, rotation of spool 18 results in grain bag 112 accumulating on spool 18. Referring to FIG. 9E, when it is desirable to remove that portion of grain bag 112 which has rolled onto spool 18 as it has reached a selected diameter or selected weight, the machine is shut down and spool 18 is unwound one turn to release the tension upon grain bag 112. Grain bag 112 is then cut off. Referring to FIGS. 6 and 7, locking clamp 40 is then released to permit male coupling 31 to be withdrawn from second female receiver 38. This enables second end flange 22 to be removed along with second support member 26. Referring to FIG. 9F, with spool 18 partially disassembled, there is enough clearance for grain bag 112 to be removed from first support member 24.

A distinct advantage of the present system, is how quickly operations can be resumed after rolled up portion of grain bag 112 is removed from first support member 24. It is merely a matter of feeding the free end of grain bag 112 back onto spool 18 and operations can be resumed.

Variations

Figure 28:
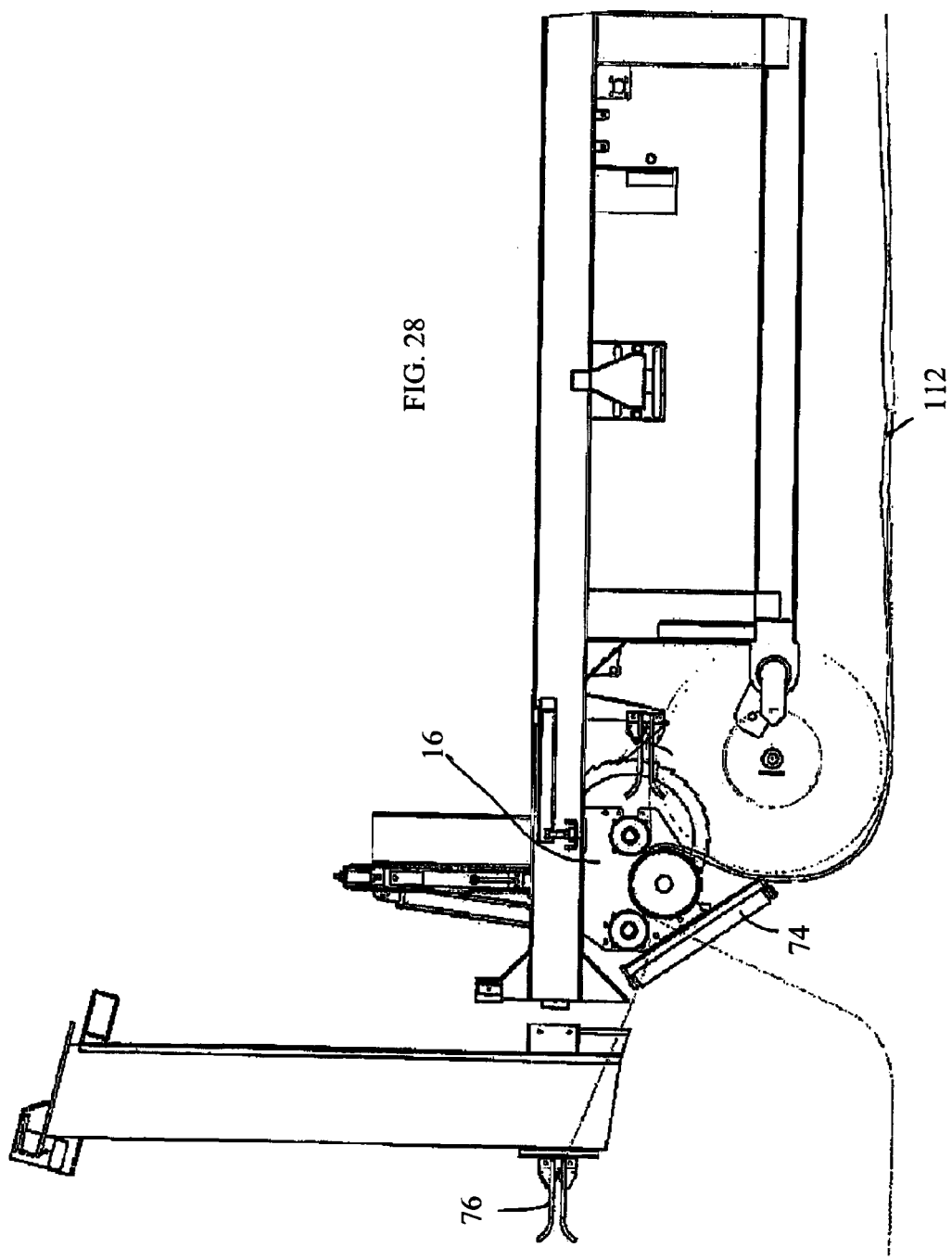
FIG. 28 is a side elevation view of the bag feeding assembly showing a variation in which the grain bag is driven over.

Referring to FIG. 28, there is illustrated a variation in which the above described superior grain bag feeding assembly is used with a machine that excretes and then drives over grain bag 112.

Figure 29:
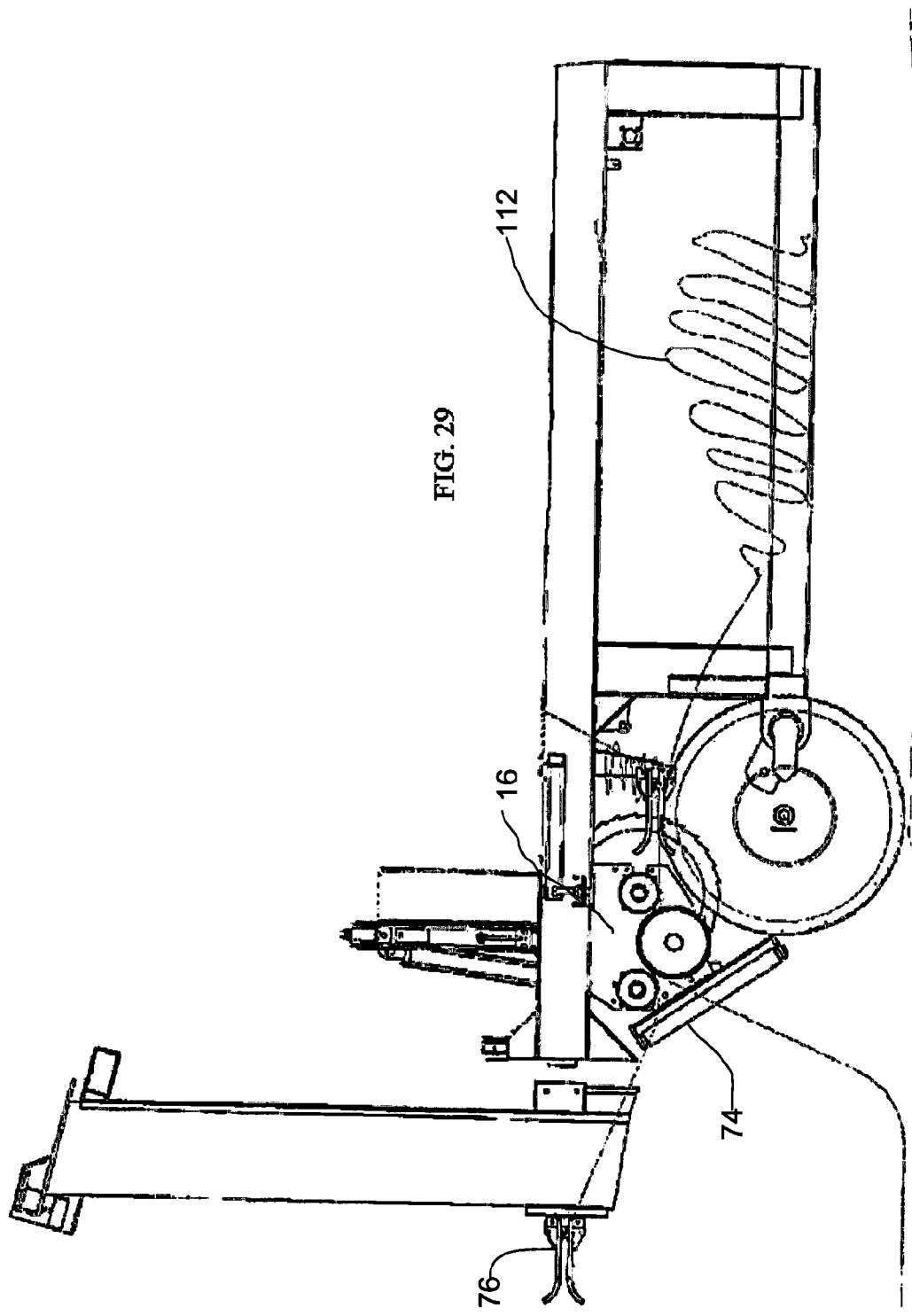
FIG. 29 is a side elevation view of the bag feeding assembly showing a variation in which the grain bag is bunched and then excreted.

Referring to FIG. 29, there is illustrated a variation in which the above described superior grain bag feeding assembly is used with a machine that bunches and then excretes grain bag 112. Grain bag 112 can be run down the interior machine or diverted to either side.

Figure 30:
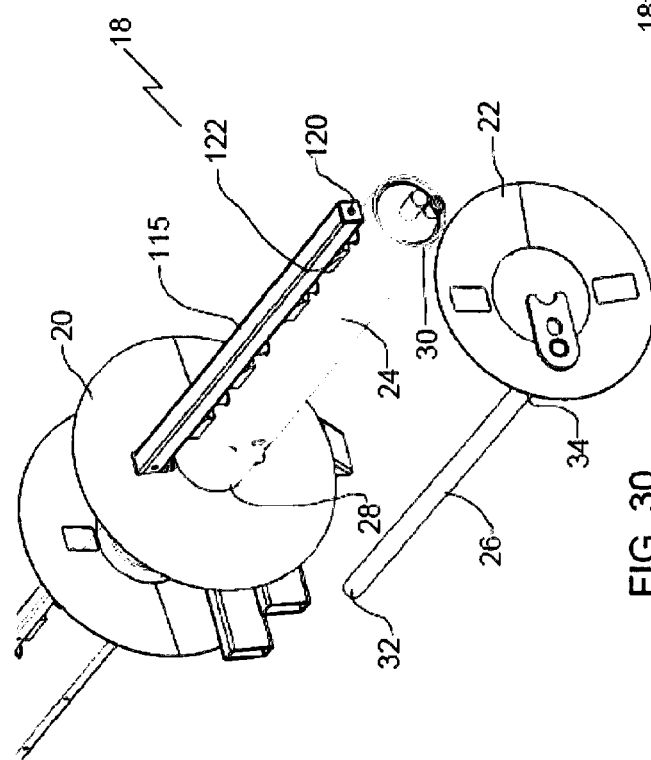
FIG. 30 is a perspective view of a variation of the spool assembly.

Referring to FIG. 30, there is illustrated a variation that includes an expansion bar 115 in which the effective winding diameter of spool 18 is adjustable. The bag material is clamped onto spool 18 as describe above using large first support member 24 and small second support member 26, with the material being wound over expansion bar 115 as well. As shown, the amount of separation between expansion bar 115 and large first support member 24 is adjusted by turning an adjusting bolt 120, which causes ramped surfaces 122 to slide relative to one another, either to increase or decrease the effective winding diameter of spool 18. Other techniques may also be used as will be recognized by those skilled in the art. Preferably, expansion bar 115 is in an expanded state when the bag material is attached, and reduced to a contracted state when the bag material is removed, which relaxes the inner windings of plastic on spool 18 to make it easier to remove. An alternative to this configuration is shown in FIG. 35.

Figure 31:
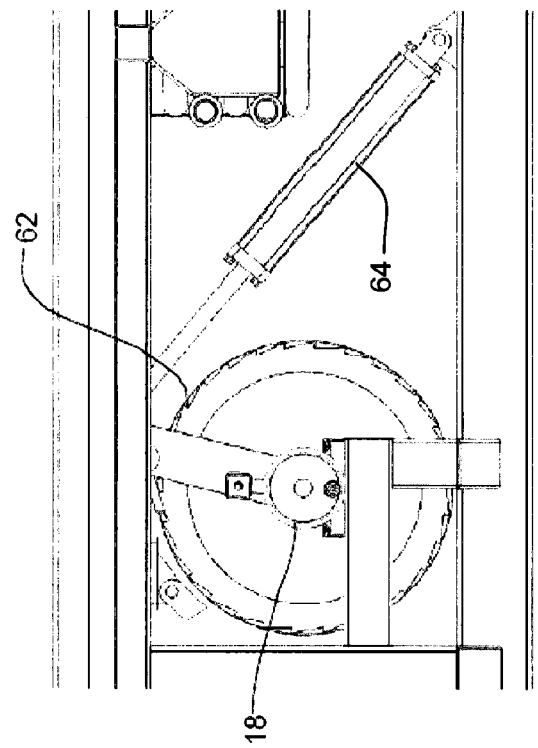
FIG. 31 is a detailed side elevation view of a variation of the drive system in which the grain bag is drawn by the spool assembly.
Figure 32:
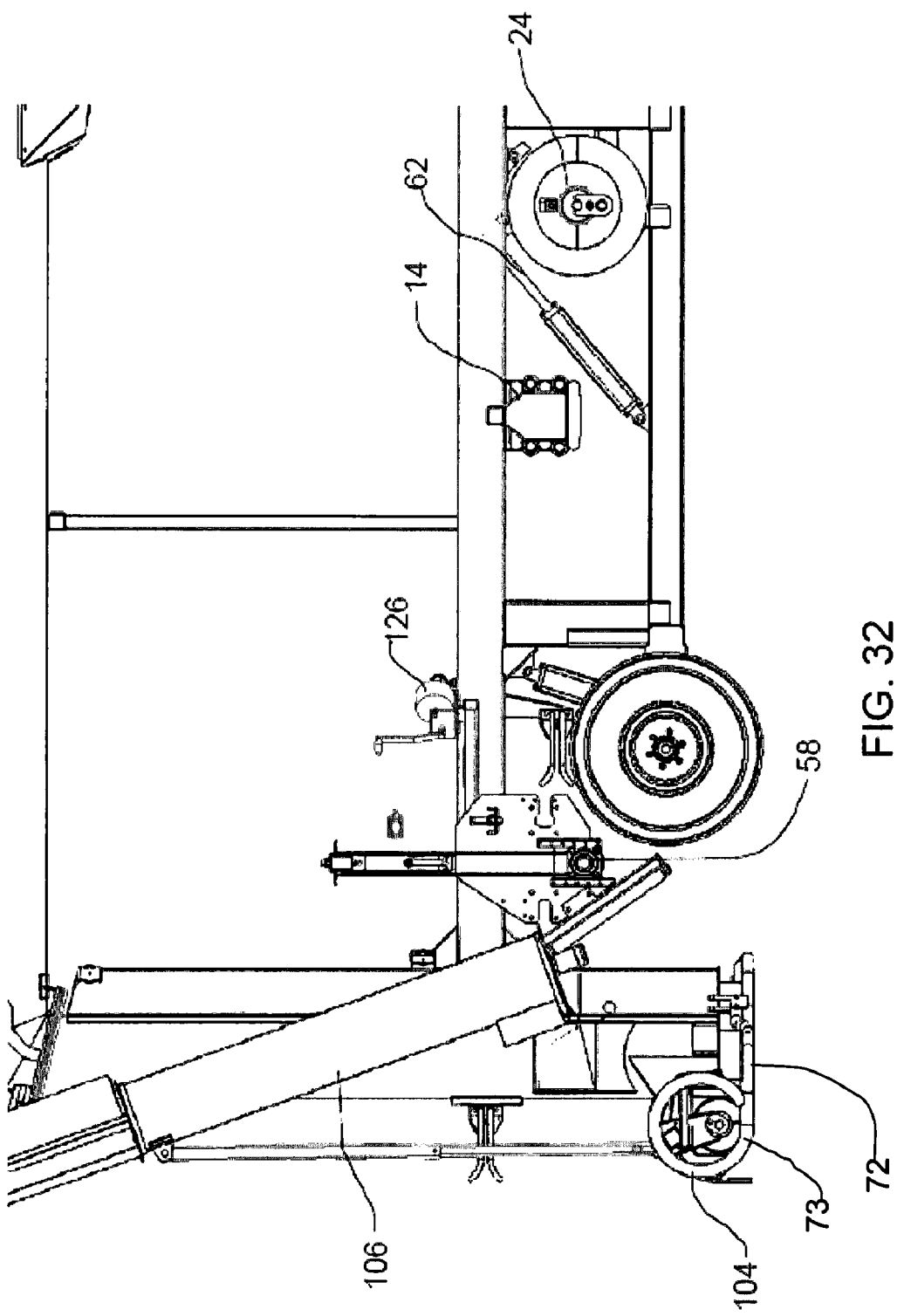
FIG. 32 is a side elevation view of the bag feeding assembly showing a variation in which the grain bag is drawn by the spool assembly.
Figure 34:
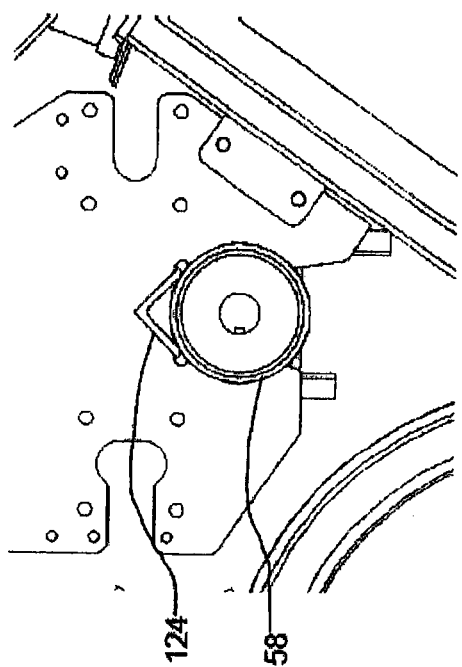
FIG. 34 is a side elevation view of the brake bar shown in FIG. 31 in an engaged position.
Figure 33:
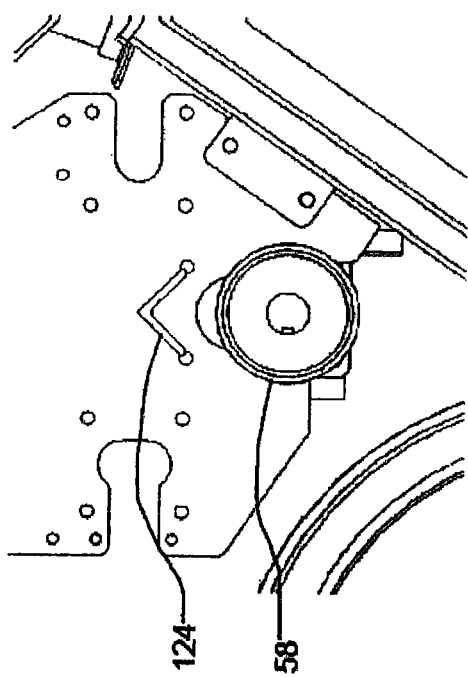
FIG. 33 is a side elevation view of a brake bar in the disengaged position.

Referring to FIGS. 31 and 32, there is illustrated a variation in which ratchet drive 62 drives spool assembly 12 instead of bag feed assembly 16. In this case, hydraulic actuator 64 and valves 65 and 67 shown in FIGS. 39 and 40 control the movement of spool 12, and the pulling force applied may be used to move assembly 10 forward. Preferably, ratchet drive 62 is positioned between spool assemblies 12 for each section of surplus material 112, rather than at one end only. In this situation, only one roller 58 is necessary, as the pinch points between rollers are no longer needed to pull material 112. Referring to FIGS. 33 and 34, roller 58 has a brake bar 124 that allows material 112 to be held in place, either during the initial threading, or when material 112 is removed from spool 18. To set brake bar 124, roller 58 is raised by cranking crank 126 (shown in FIG. 32) until roller 58 engages bar 124 to hold material 112 in place. Prior to setting the brake, it should be ensured that there is sufficient material to perform the desired operation. If it is an initial threading, material is simply locked to spool 18 using large first support member 24 and relatively small second support member 26 of spool assembly 12 as described above. If spool 18 is full, then material 112 is cut, adjusting bolt 120 shown in FIG. 30 is loosened to relieve tension, second end flange 22 is removed along with second support member 26, and the roll is removed from spool 18. Material 112 is again locked onto spool 18. Once material 112 is locked into place, spool 18 is rotated to take up any slack, and brake bar 124 is released by lowering roller 58.

Figure 35:
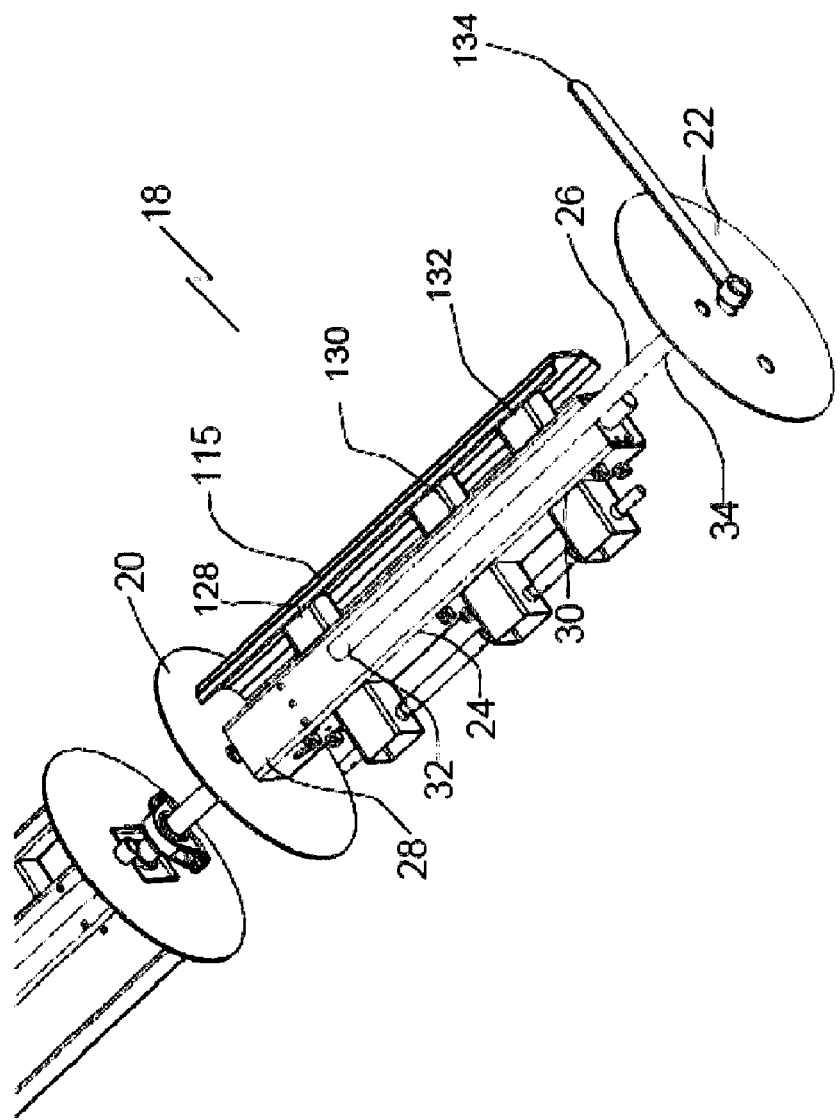
FIG. 35 is a perspective view of a variation of the spool assembly.

Referring to FIG. 35, there is illustrated a further variation, where the amount of separation between expansion bar 115 and the large first support member 24 is adjusted by turning a removable handle (not shown) that attaches to the jacking mechanism 131. When actuated, jacking mechanism 131 causes jacks, such as a first jack 128, a second jack 130 and a third jack 132 either to increase or decrease the effective winding diameter of spool 18. A tension arm 134 provides support for this system to front cross beam.

Alternatively, referring to FIG. 36, an unwinding spool 144 may be provided. This is particularly useful, for example, when spool 18 is also used as the drive source for the grain bag. As the grain bag is pulled onto spool 18, it becomes compressed and difficult to remove. The grain bag can be removed by attaching the trailing edge to unwinding spool 144, and powering unwinding spool 144 to pull the bag off spool 18. This results in a roll of material that is less compressed, and more easily removed and manipulated.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A grain bag handling assembly for a grain bag unloading apparatus having a chassis and an auger assembly with an input end which is inserted into a mouth of an elongated grain bag and a remote output end, the grain bag handling assembly comprising:
    a bag feeding assembly comprising:
        a feed mouth that is smaller than the width of the grain bag; and
        guide rollers to guide the grain bag into the feed mouth;
        a hold down frame to hold down a bottom of the grain bag, the hold down frame and a horizontal auger of the auger assembly being supported at a selected height above a ground surface by the chassis, the hold down frame being positioned in proximity to and extending for a length of the horizontal auger to provide a path for the grain bag to freely pass under without sustaining damage from the horizontal auger; and
        a bag driver for applying a force to pull the grain bag under the hold down frame and up through the feed mouth.

2. The grain bag handling assembly of claim 1, wherein at least two of the guide rollers are vertically oriented guide rollers positioned on opposed sides of the feed mouth.

3. The grain bag handling assembly of claim 1, wherein at least one of the guide rollers is a horizontally oriented lift roller provided to raise the grain bag prior to it passing through the feed mouth wherein grain drops back into the grain bag rather than being carried through the feed mouth.

4. The grain bag handling assembly of claim 1, wherein the bag driver is a bag collection assembly, the bag collection assembly comprising at least one driven roller upon which the grain bag is rolled.

5. The grain bag handling assembly of claim 4, wherein the driven roller has a ratchet drive.

6. The grain bag handling assembly of claim 1, wherein the bag driver is comprised of:
    at least two gripping rollers for gripping and drawing the grain bag through the feed mouth.

7. The grain bag handling apparatus of claim 6, wherein at least one of the at least two gripping rollers effects a change in the travel direction of the grain bag.

8. The grain bag handling assembly of claim 1, wherein a top knife is positioned prior to the feed mouth to cut open the top of the grain bag as it is drawn into the feed mouth.

9. The grain bag handling assembly of claim 8, wherein a bottom knife is provided to cut a bottom of the grain bag as it exits the bag feeding assembly, such that the combination of the top knife and the bottom knife cuts the grain bag into two independent grain bag pieces.

10. The grain bag handling assembly of claim 1, wherein the bag feeding assembly further comprises hold out rings on each end of the auger assembly.

11. The grain bag handling assembly of claim 1, wherein the bag feeding assembly further comprises hold out rings on each end of the auger assembly.

12. A grain bag handling assembly for a grain bag unloading apparatus having an auger assembly with an input end which is inserted into a mouth of an elongated grain bag and a remote output end, the grain bag handling assembly comprising:
    a bag feeding assembly comprising:
        a feed mouth that is smaller than the width of the grain bag;
        a hold down frame to hold down a bottom of the grain bag, the hold down frame and a horizontal auger of the auger assembly being supported at a selected height above a ground surface by the chassis, the hold down frame being positioned in proximity to and extending for a length of the horizontal auger to provide a path for the grain bag to freely pass under without sustaining damage from the horizontal auger;

at least one guide roller in the form of a horizontally oriented lift roller to raise the grain bag as it passes through the feed mouth wherein grain drops back into the grain bag rather than being carried through the feed mouth;

a top knife positioned prior to the feed mouth to cut open the top of the grain bag as it is drawn into the feed mouth; and a bag driver for applying a force to move the grain bag through the feed mouth.

13. The grain bag handling assembly of claim 12, wherein the bag feeding assembly further comprises vertically oriented guide rollers positioned on opposed sides of the feed mouth to guide the grain bag into the feed mouth.

14. The grain bag handling assembly of claim 13, wherein the bag driver is comprised of a bag drive and collection assembly comprising at least one driven roller upon which the grain bag is rolled and which concurrently applies a force to move the grain bag through the feed mouth.

15. The grain bag handling assembly of claim 14, wherein a bottom knife is provided to cut a bottom of the grain bag as it exits the bag feeding assembly such that the combination of the top knife and the bottom knife cuts the grain bag into two independent grain bag pieces, and the bag drive and collection assembly is comprised of two spaced apart driven rollers, each of the driven rollers collecting one of the two independent grain bag pieces.

16. The grain bag handling assembly of claim 15, wherein the driven rollers are in axial alignment and a rotational driver is positioned between the two driven rollers, the rotational driver rotating both of the driven rollers.

17. The grain bag handling assembly of claim 14, wherein the at least one driven roller has a ratchet drive.

18. The grain bag handling assembly of claim 17, wherein the ratchet drive is hydraulic and a cycling valve is provided for actuating the hydraulic ratchet drive.

19. The grain bag handling assembly of claim 18, further comprising a hydraulic fluid flow rate valve for controlling the rotational speed of the ratchet drive.

* * * * *